(12) United States Patent
Johnston et al.

(10) Patent No.: US 6,212,675 B1
(45) Date of Patent: Apr. 3, 2001

(54) PRESENTATION OF VISUAL PROGRAM TEST COVERAGE INFORMATION

(75) Inventors: Gary Martin Johnston, Durham, NC (US); Mila Keren, Nesher (IL); Anthony Hayden Lindsey, Fuquay Varina, NC (US); Yael Shaham-Gafni, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/154,231

(22) Filed: Sep. 16, 1998

(51) Int. Cl.[7] ........................................................ G06F 9/45
(52) U.S. Cl. ........................ 717/4; 717/1; 717/2; 714/38; 714/39; 714/45; 714/46; 345/339; 345/334; 345/349; 345/967
(58) Field of Search ..................................... 395/704, 701; 717/4, 1, 2; 714/38, 39, 35, 47, 45, 46; 345/333, 339, 326, 967, 968, 334, 348, 349

(56) References Cited

U.S. PATENT DOCUMENTS

| | | | |
|---|---|---|---|
| 5,307,498 | * | 4/1994 | Eisen et al. ........................... 395/704 |
| 5,511,185 | * | 4/1996 | Weinbaum et al. ................... 714/38 |
| 5,657,438 | * | 8/1997 | Wygodny et al. ........................ 714/1 |
| 5,781,720 | * | 7/1998 | Parker et al. ........................... 714/38 |
| 5,832,270 | * | 11/1998 | Laffra et al. ........................... 395/703 |
| 5,905,856 | * | 5/1999 | Ottensooser ........................... 714/38 |
| 5,926,176 | * | 7/1999 | McMillian et al. ................... 345/339 |
| 5,974,572 | * | 10/1999 | Weinberg et al. ...................... 714/47 |

OTHER PUBLICATIONS

Kelly C. Bourne, "Client/Server Testing Tools," Article DBMS, May 1996 [online]. DBMS Online [retrieved on 2000–03–01] 10 pages.* Retrieved from the Internet:<URL:www.dbmsmag.com/9606d16.html>.*

Bieman et al, "Using Fault Injection to Increase Software Test Coverage," IEEE Proceedings., Seventh Int'l Symposium on Software Reliability Engineering, Oct. 30–Nov. 2, 1996, pp. 166–174.*

Ostrand et al, "A Visual Test Development Environment for GUI Systems," Proceedings of ACM SIGSOFT Int'l Symposium on Software Testing and Analysis, Mar. 2–4, 1998, pp. 82–92.*

Beer et al, "IDATG: An Open Tool for Automated Testing of Interactive Software," IEEE Proceedings., COMPSAC '98 The Twenty–Second Annual Int' of Computer Software and Applications Conference, Aug. 19–21, 1998, pp. 470–475.*

* cited by examiner

Primary Examiner—Kakali Chaki
Assistant Examiner—Tuan Q. Dam
(74) Attorney, Agent, or Firm—Gregory M. Doudnikoff; Marcia L. Doubet

(57) ABSTRACT

A technique, system, and computer program for presenting test coverage metrics in a visual programming environment. The information is presented in the same general visual manner in which a visual programmer creates a visual program. A number of alternative presentation styles are defined whereby the visual program is augmented to indicate test coverage status. For example, when displaying connections, one color may be used when displaying a connection to indicate that it has been covered, while a different color is used for connections that were not covered. Or, different line styles (such as solid versus dashed, or different degrees of line thickness) may be used to represent the same information. Alternatively, the test coverage status may be indicated by annotating the graphical representation of the visual program with text (such as "covered" or "not covered").

24 Claims, 14 Drawing Sheets

PRESENTATION OF VISUAL PROGRAM TEST COVERAGE INFORMATION

CROSS-REFERENCE TO RELATED INVENTIONS

This application is related to U.S. patent application Ser. No. 09/154,127 entitled "A Technique for Test Coverage of Visual Programs"; U.S. patent application Ser. No. 09/154,126 entitled "Visual Program Runtime Performance Analysis"; and U.S. patent application Ser. No. 09/154,121 entitled "Presentation of Visual Program Performance Data", all assigned to the International Business Machines Corporation (IBM) and filed concurrently herewith.

BACKGROUND OF THE INVENTION

1. Field of the Invention

The present invention relates to computer software, and deals more particularly with a method, system, and computer program for presenting visual program test coverage information. The information is presented in the same general visual manner in which a visual programmer creates a visual program. A number of alternative presentation styles are defined.

2. Description of the Related Art

Testing is an important part of the software development cycle. The motivation for testing software is to raise the quality and reliability of the program, and to establish confidence that the program does what it is supposed to do. Assuming that programs contain errors, the purpose of testing is to find as many of the errors as possible. Thus, testing may be considered as the process of executing a program with the intent of finding errors.

Testing is a costly and time-consuming activity. Finding all the errors in a program is virtually impossible, because to do this, one must test the program for all possible inputs in all possible states-which, except for the most trivial of programs, is a prohibitively large number. The more tests that are executed, the higher the confidence level in the quality of the program code, but with a corresponding increase in time and money invested in the testing process. Since there can be no proof that, at a point in time, the program has no more bugs, the question arises: how much testing is sufficient? Techniques and tools have been developed to assist in evaluating the sufficiency of the testing. The main technique for demonstrating that testing has been thorough is called test coverage analysis.

Test coverage analysis is discussed in detail in "Software Testing Techniques", 2nd edition, by Boris Beizer, published by International Thomson Computer Press (1990). Simply stated, the idea of test coverage analysis is to create, in some systematic fashion, a large and comprehensive list of tasks corresponding to the program under test. This list of tasks is then compared to the tasks covered in the actual test, from which various metrics can be determined. The most widely practiced coverage technique is code coverage, where the list of tasks to be covered is derived statically from analysis of the syntactic properties of the program code. For example, statement coverage and branch coverage are typical code coverage metrics. Statement coverage is concerned with counting the number of statements of program code that are executed during a test, and comparing this number to the total number of statements in the program. Branch testing, or branch coverage, is concerned with testing each branching statement (e.g. an IF . . . THEN . . . ELSE statement, or a SELECT statement) under conditions that will cause specific branches to be taken. The branch coverage metric then indicates how many of the possible branches in the code have been exercised during the test.

Component-based visual programs introduce a new challenge to measuring code coverage. (The term "visual program" is used herein as a shorthand for "component-based visual program".) Visual programs are different from conventional programs in several important ways. Because of these differences, known test coverage techniques cannot be applied to this new programming domain in a way that provides meaningful results-and without the ability to define test coverage metrics for visual programs, it is difficult to assess program quality and reliability, which may negatively affect the acceptance of such programs by end-users.

A first difference between visual programs and conventional programs relates to the types of building blocks used by a programmer in creating a program, and a second difference lies in the source of those building blocks. Visual programs are graphically constructed primarily from pre-built components, equivalently referred to as "parts", which are typically supplied (along with the code which implements those components) by the vendor of the visual programming environment (or by a third-party vendor of such parts). Examples of visual programming environments are VisualAge for Java and VisualAge Smalltalk, from the International Business Machines Corporation ("IBM"). VisualAge is a registered trademark of IBM, and Java is a trademark of Sun Microsystems, Inc. A conventional programmer, on the other hand, typically writes program code himself using textual source-code statements of a programming language such as the C language. The source code statements specify data definition, as well as all operations on the data that are required in order to achieve the desired end result. Alternatively, in an object-oriented programming environment, the object-oriented programmer writes programs in a programming language such as Smalltalk, by creating or re-using objects and methods. Because the object-oriented programmer writes programs using source language coding statements, object-oriented programming will be considered as a "conventional" programming environment for purposes of the present invention. The visual programmer writes a program by selecting from the pre-built components (often by selecting visual representations of these components), and specifying how, and in what sequence, the selected components will interact. The visual programming environment software then generates executable code that will implement the specified interactions.

This generated code is constructed by the visual programming environment, and thus it can be expected that it correctly implements the components and interactions specified visually by the visual programmer. Testing this generated code during testing of the visual program is therefore likely to be a redundant effort, wasting time and resources that could be better spent in testing the program elements created by the visual programmer. Further, if this generated code is included in existing test coverage metrics (i.e. measurements computed in terms of statements executed, or branches taken), the resulting statistics will obscure information related to how much of the visual program written by the visual programmer has been covered. In addition, because visual programs are written using components and interactions, metrics expressed in terms of statements and branches do not provide a useful coverage measure for testing this type of program. And, if coverage expressed in these metrics indicates insufficient testing, there is no correlation to the components and/or interactions which are the ones needing more testing. Finally, showing the visual programmer which source code statements were (or were not) covered requires him to work at a different level (i.e. generated text, using source code in a programming language such as C or Smalltalk) during testing than that in which he worked while programming (i.e. visually, using parts and interactions), which may be confusing, error prone, and inefficient.

Accordingly, what is needed is a technique for measuring test coverage of visual programs, and presenting the coverage metrics in a manner that is useful to the visual programmer. The technique for measuring test coverage is the subject of the related invention having Ser. No. 09/154,127, titled "A Technique for Test Coverage of Visual Programs", which is incorporated herein by reference. This technique accounts for the specialized nature of visual programs, which are typically created by graphically specifying interactions between prebuilt components. The metrics provide information that is useful to the programmer working in this environment, indicating test coverage in terms of elements that correspond to a visual program. There is a need to present these metrics in the same general visual manner in which the visual program was created, so that the visual programmer can analyze the coverage information conveniently, seeing the coverage metrics in a program view with which he is already familiar.

SUMMARY OF THE INVENTION

An object of the present invention is to provide a technique for presenting test coverage metrics for a visual program in a manner that is familiar to the visual programmer.

Another object of the present invention is to provide this technique by presenting test coverage metrics using substantially the same view used by the programmer for creating a visual program.

Yet another object of the present invention is to present test coverage metrics by augmenting the visual program view with additional information.

It is another object of the present invention to provide this additional information using color, line thickness, line style, added text, or other graphical representations.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for presenting test coverage metrics in a computing system having a capability for visual programming. This technique comprises one or more visually-created programs, wherein each of the programs comprises a plurality of elements; means for constructing a view of a selected one of the programs; and means for augmenting the constructed view to indicate a test coverage status.

Preferably, the means for constructing further comprises means for obtaining all of the elements, and the means for augmenting further comprises means for visually indicating an element test coverage status for one or more of the elements. Optionally, the means for visually indicating further comprises using a first color for each of the elements having the element test coverage status which indicates covered, and a second color for each of the elements having the element test coverage status which indicates not covered. Or, the means for visually indicating may further comprise using a first line style for each of the elements having the element test coverage status which indicates covered, and a second line style for each of the elements having the element test coverage status which indicates not covered. Alternatively, the means for visually indicating may further comprise using a first line thickness for each of the elements having the element test coverage status which indicates covered, and a second line thickness for each of the elements having the element test coverage status which indicates not covered. Or, the means for visually indicating may further comprise using a first hidden status for each of the elements having the element test coverage status which indicates covered, and a second hidden status for each of the elements having the element test coverage status which indicates not covered. Alternatively, the means for visually indicating may further comprise means for annotating each of the elements with a textual indication of the element test coverage status. Preferably, the element test coverage status is obtained from stored information containing a Boolean indicator for each of the elements which indicates if the element was covered.

The present invention will now be described with reference to the following drawings, in which like reference numbers denote the same element throughout.

DESCRIPTION OF THE PREFERRED EMBODIMENT

Figure 1:
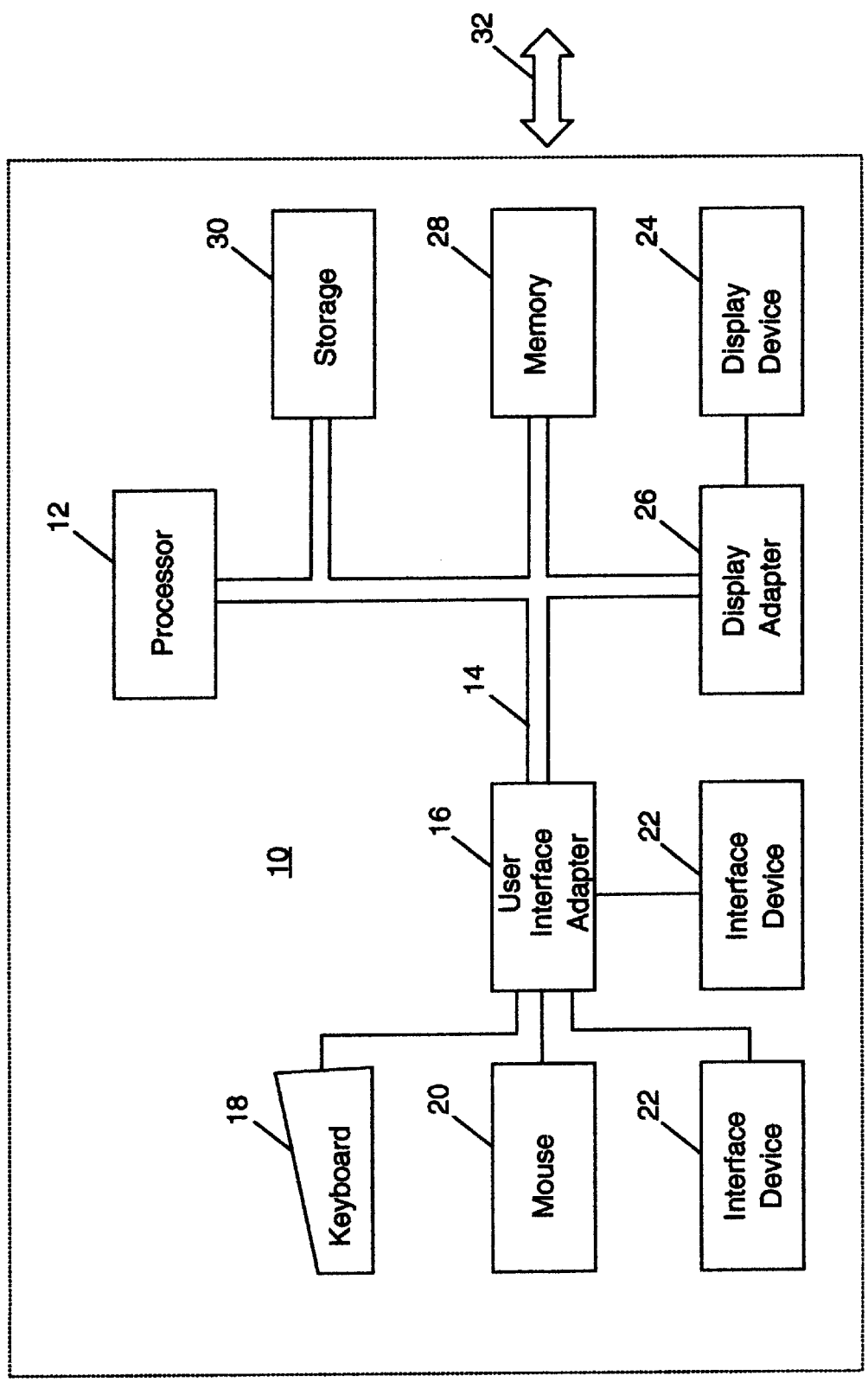
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
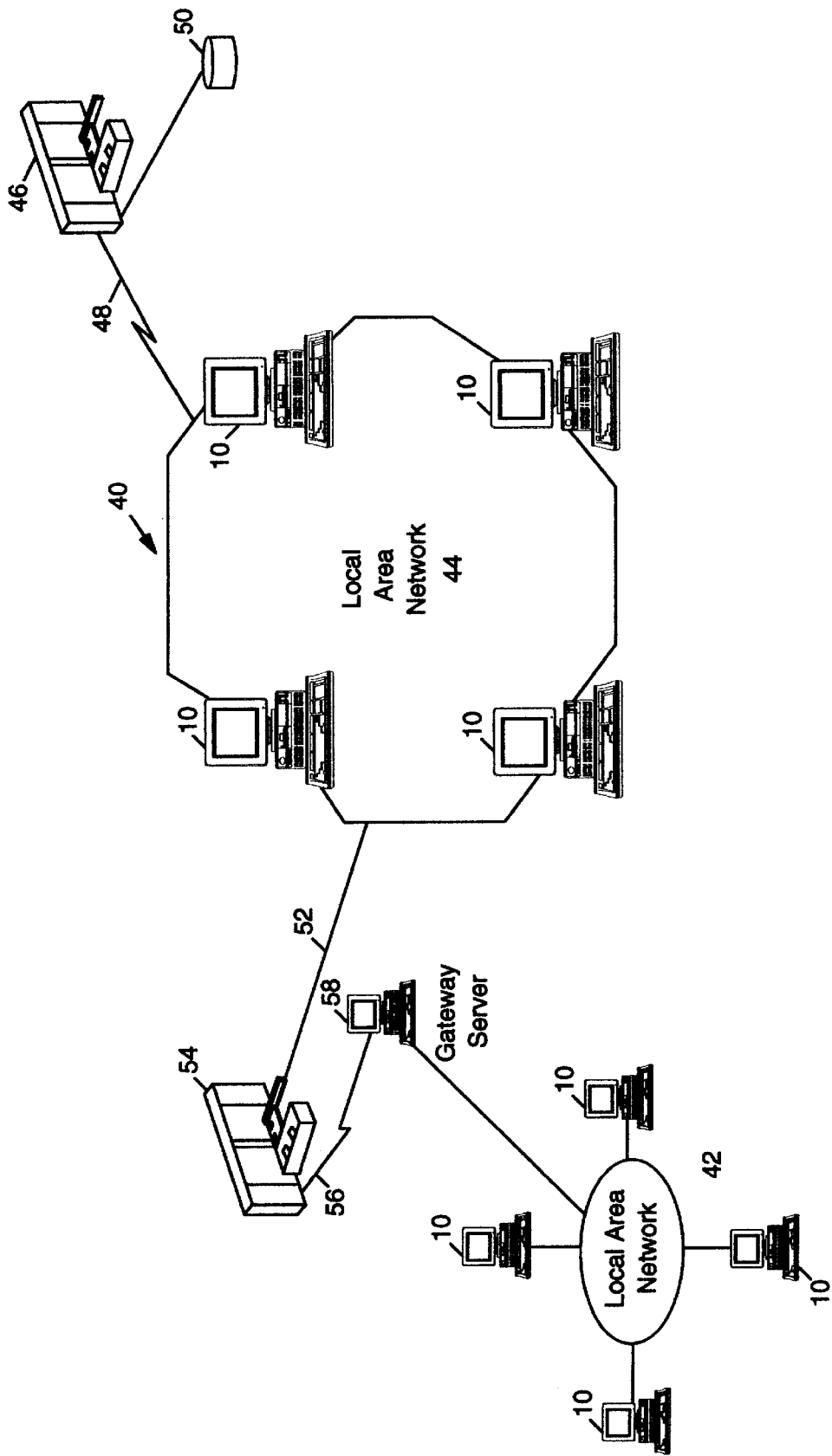
FIG. 2 is a diagram of a networked computing environment in which the present invention may be practiced.

FIG. 2 illustrates a data processing network 40 in which the present invention may be practiced. The data processing network 40 may include a plurality of individual networks, including LANs 42 and 44, each of which includes a pluarlity of individual workstations 10. Alternatively, as those skilled in the art will appreciate, a LAN may comprise a pluarlity of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370, an Enterprise Systems Architecture/390 computer available from IBM, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The client-server environment in which the present invention may be used includes an Internet environment, or an intranet environment. Additionally, the present invention may be practiced in an environment structured according to a three-tiered architecture, whereby a client-server environment is extended by adding data repositories as a third tier (such that the server now occupies the middle tier).

The preferred embodiment of the present invention will now be discussed with reference to FIGS. 3 through 7.

In the preferred embodiment, the present invention is implemented as a computer software program. The program code of the preferred embodiment may be implemented as objects (classes and methods) in an object-oriented programming language such as Smalltalk, or as instructions in a conventional procedural programming language (such as the C programming language).

The test coverage presentation technique of the present invention presents information to the visual programmer in a manner that is familiar to him, using the same view (i.e. the parts and their connections are laid out in substantially the same visual manner) that the programmer used when he created the visual program being tested. This view is augmented in a novel manner to present test coverage metrics. Various approaches to presenting this augmented information are discussed in alternative embodiments hereinafter.

Figure 3A:
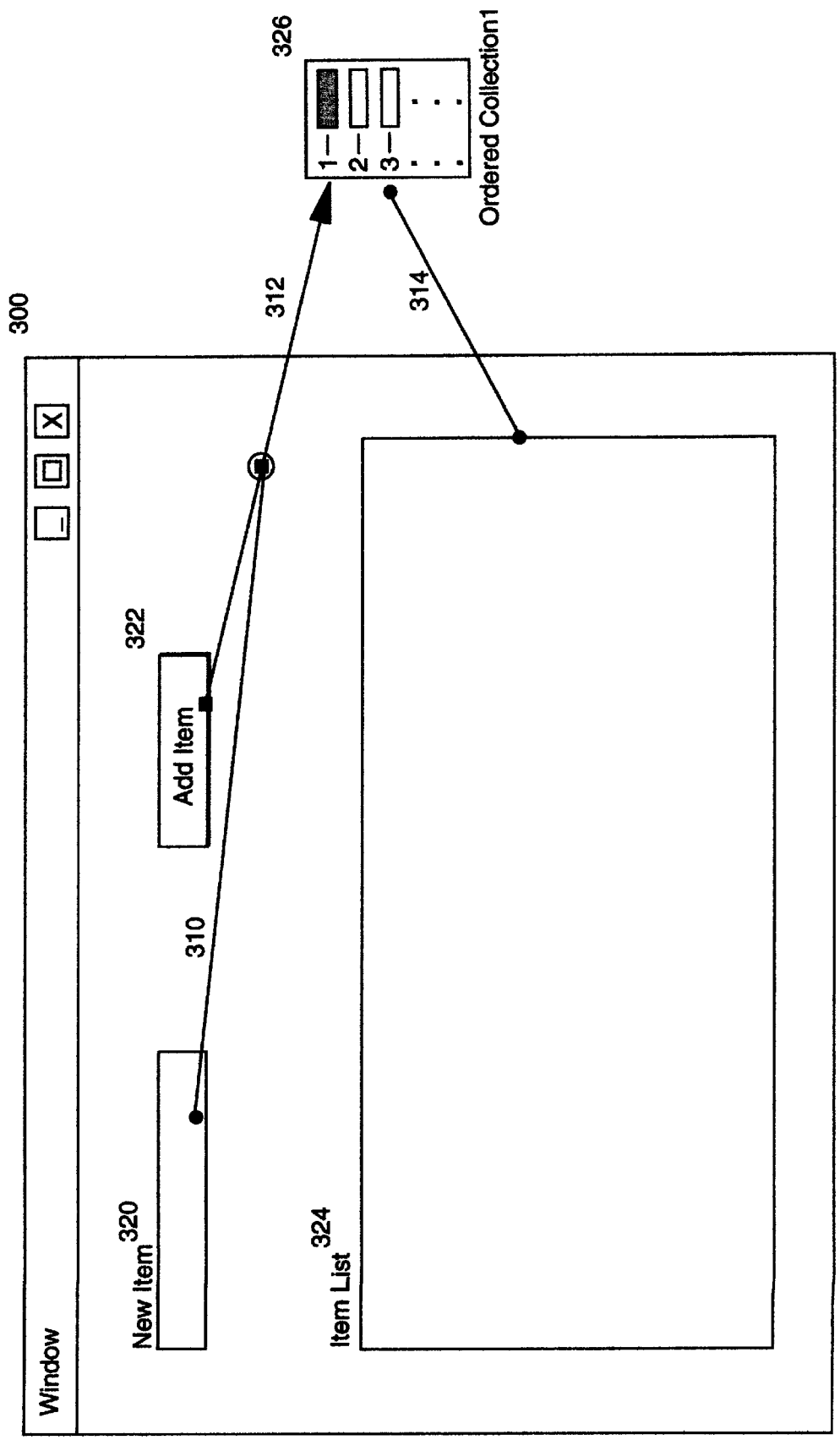
FIGS. 3A–3H illustrate a simple visually-created program that has been augmented with test coverage metrics according to alternative preferred embodiments of the present invention.

FIG. 3A shows a graphical representation 300 of a simple visually-created program which includes three connections 310, 312, 314. This visually-created program itself is a part, and includes four subparts 320, 322, 324, 326. Connection 310 is an attribute-to-attribute connection from the "New Item" part 320 to the event-to-action connection 312, which connects the "Add Item" pushbutton part 322 to the "Ordered Collection 1" part 326. Connection 314 is an attribute-to-attribute connection between the "Item List" part 324 and part 326. By connecting the "clicked" event (not shown) of the pushbutton 322's interface to the "add:" action (not shown) of the ordered collection 326's interface, the visual programmer has specified that when connection 312 fires, the corresponding event-to-action behavior occurs. In this example, the "add:" action requires a parameter, containing the element to be added to the ordered collection 326. The input parameter is obtained from input data that the end-user will enter using the entry field in New Item part 320, which is then passed as a parameter of the connection 312. Connection 314 indicates that the items in the "Ordered Collection 1" part 326 are displayed in the Item List part 324. Connection 314 is a bi-directional connection, so that a change in the "Ordered Collection 1" part 326 will cause an update to the data displayed in the Item List part 324, and vice versa.

As discussed in the related invention titled "A Technique for Test Coverage of Visual Programs", a test coverage model for visual programs should express coverage metrics in terms that are useful for the visual programmer. In a preferred embodiment of a coverage model disclosed therein, the coverage model included tasks for covering the following elements: connections, attributes, events, and actions. A collection of coverage tasks is discussed therein, whereby entries are stored for each element of interest, and each of said entries includes a Boolean value that has the value "TRUE" if the element has been covered during testing, and "FALSE" if it has not been covered. Information stored in this manner (or in an equivalent thereto) is used by the present invention in order to show test coverage by augmenting the programmer's view of the visual program.

Figure 3B:
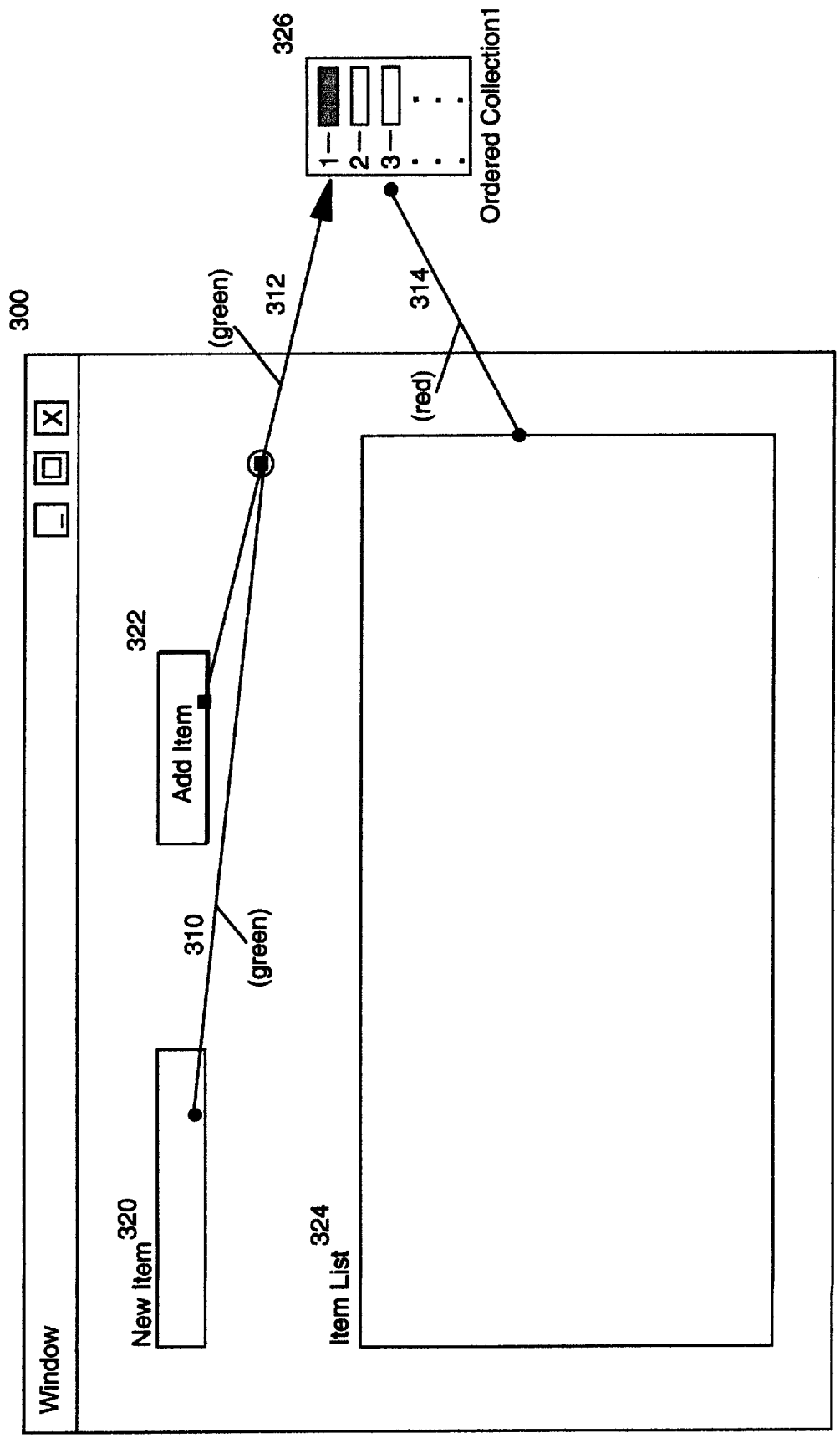
Figure 3C:
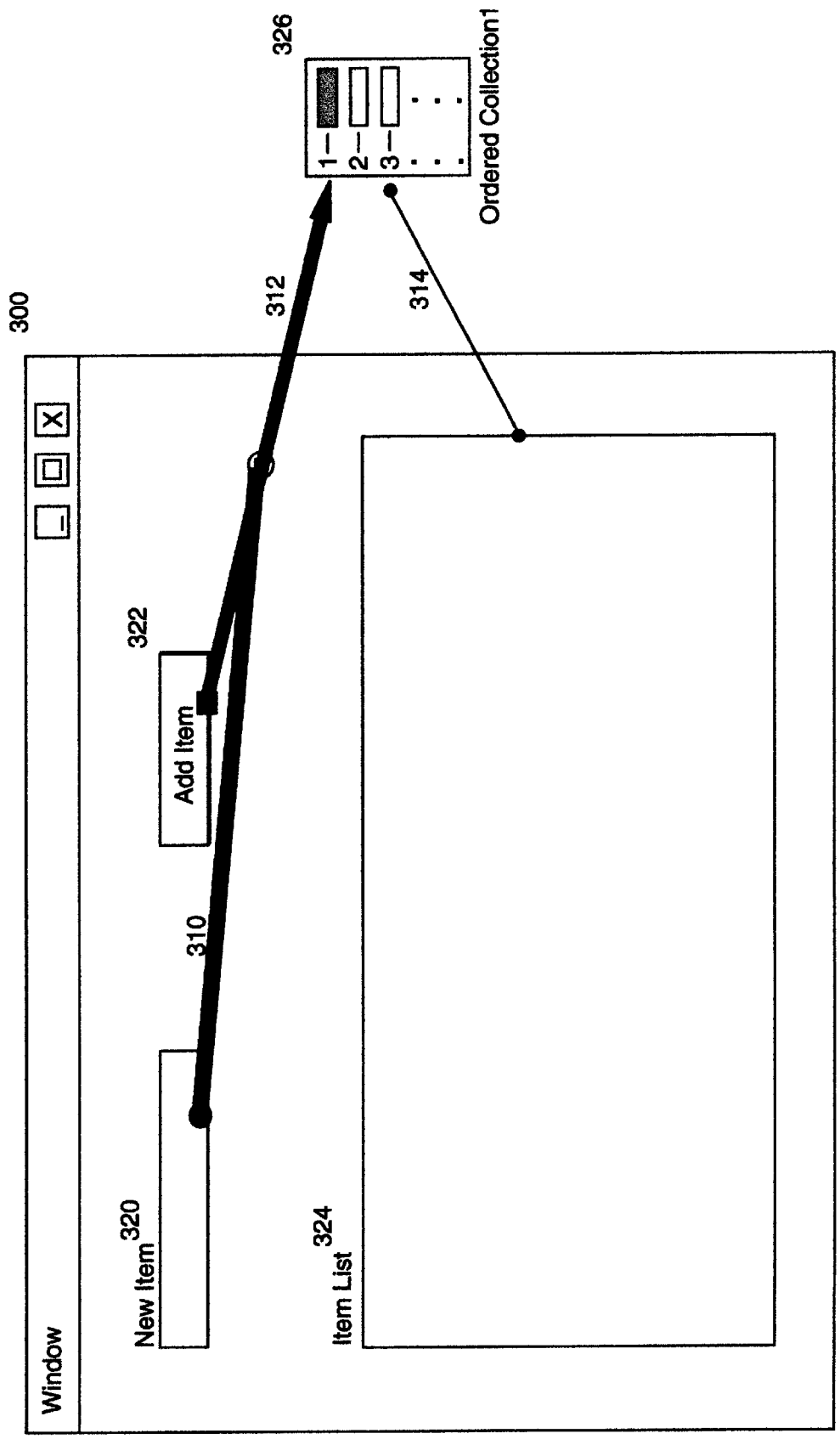
Figure 3D:
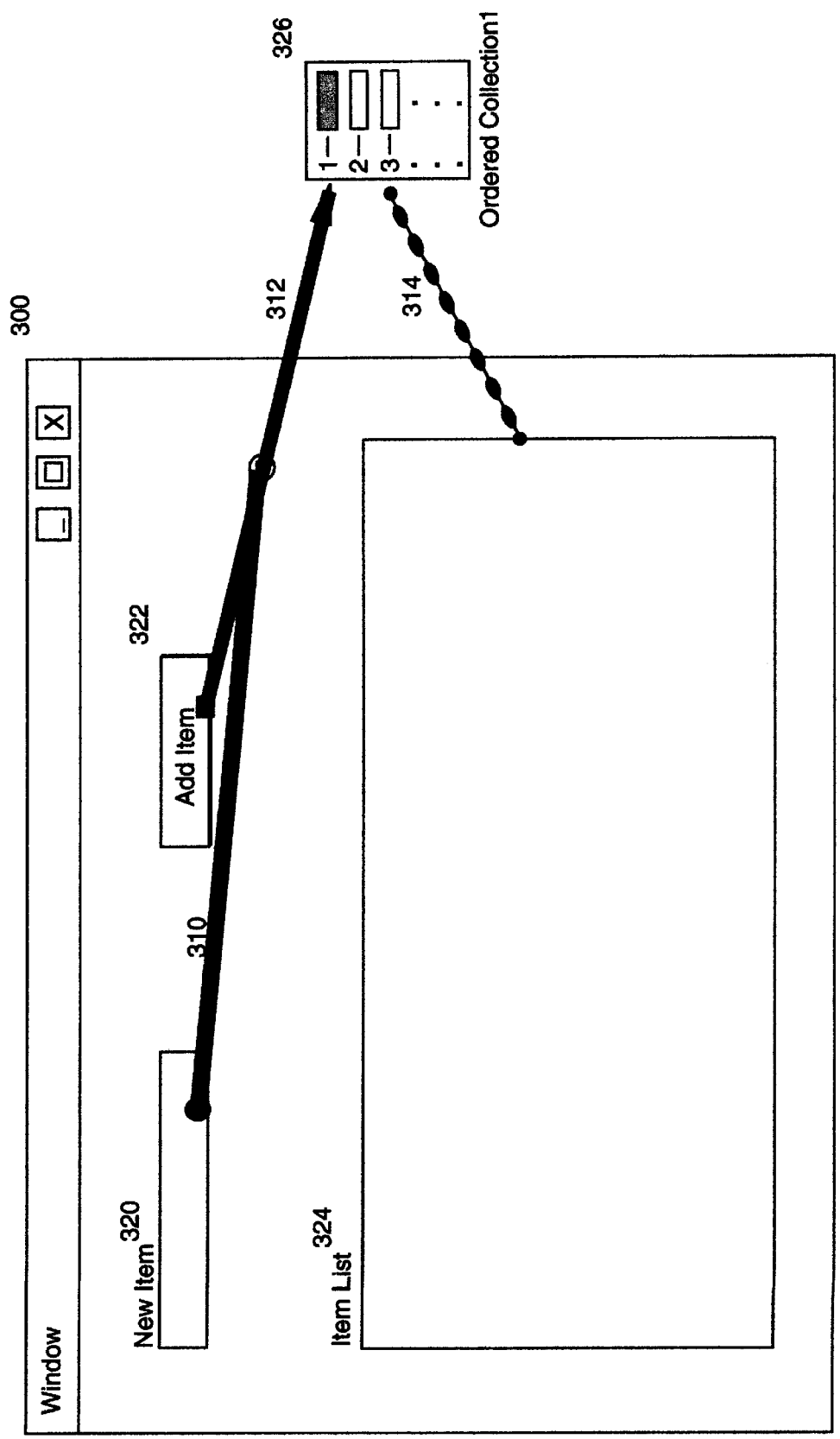
Figure 3E:
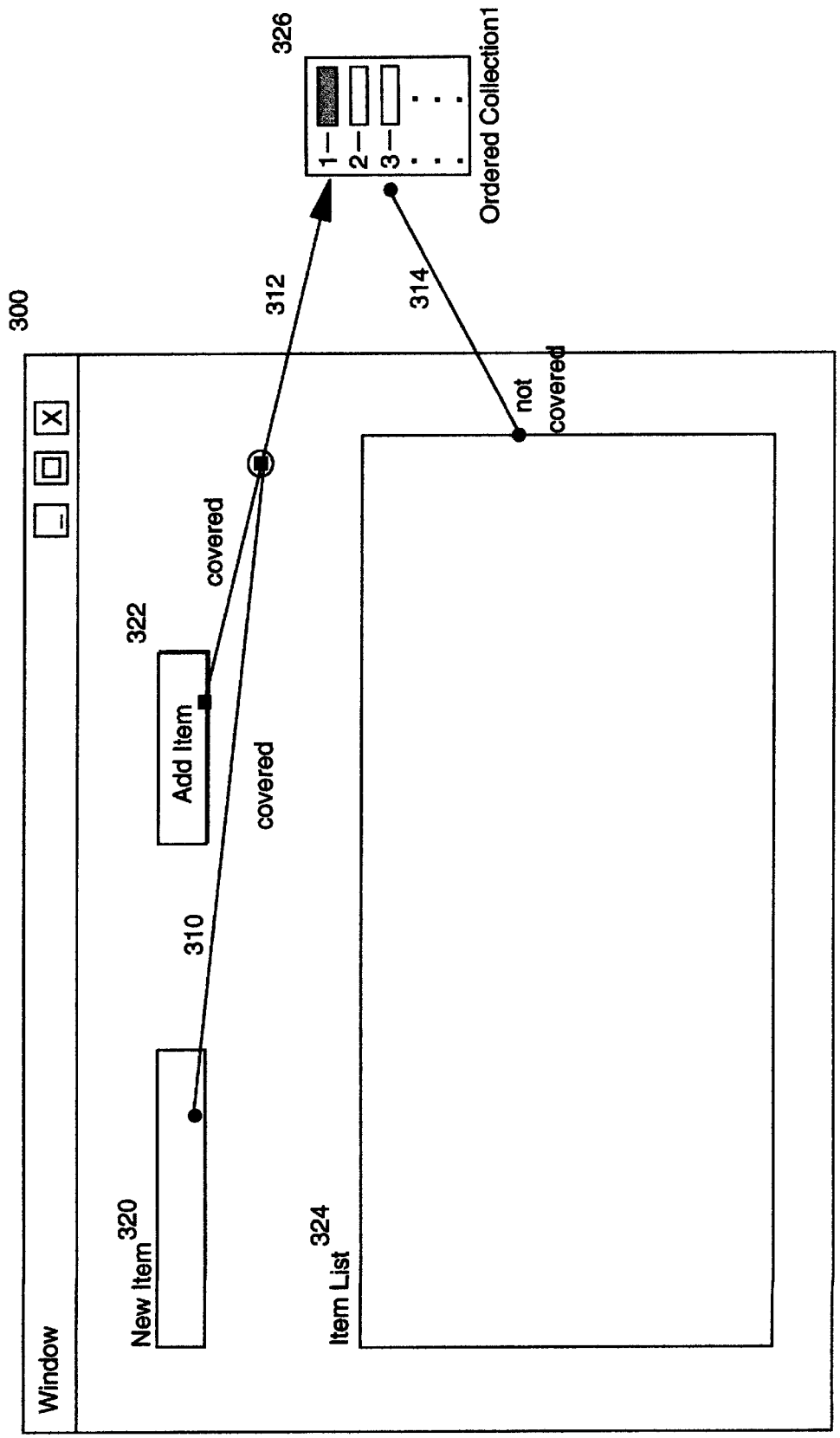
Figure 3F:
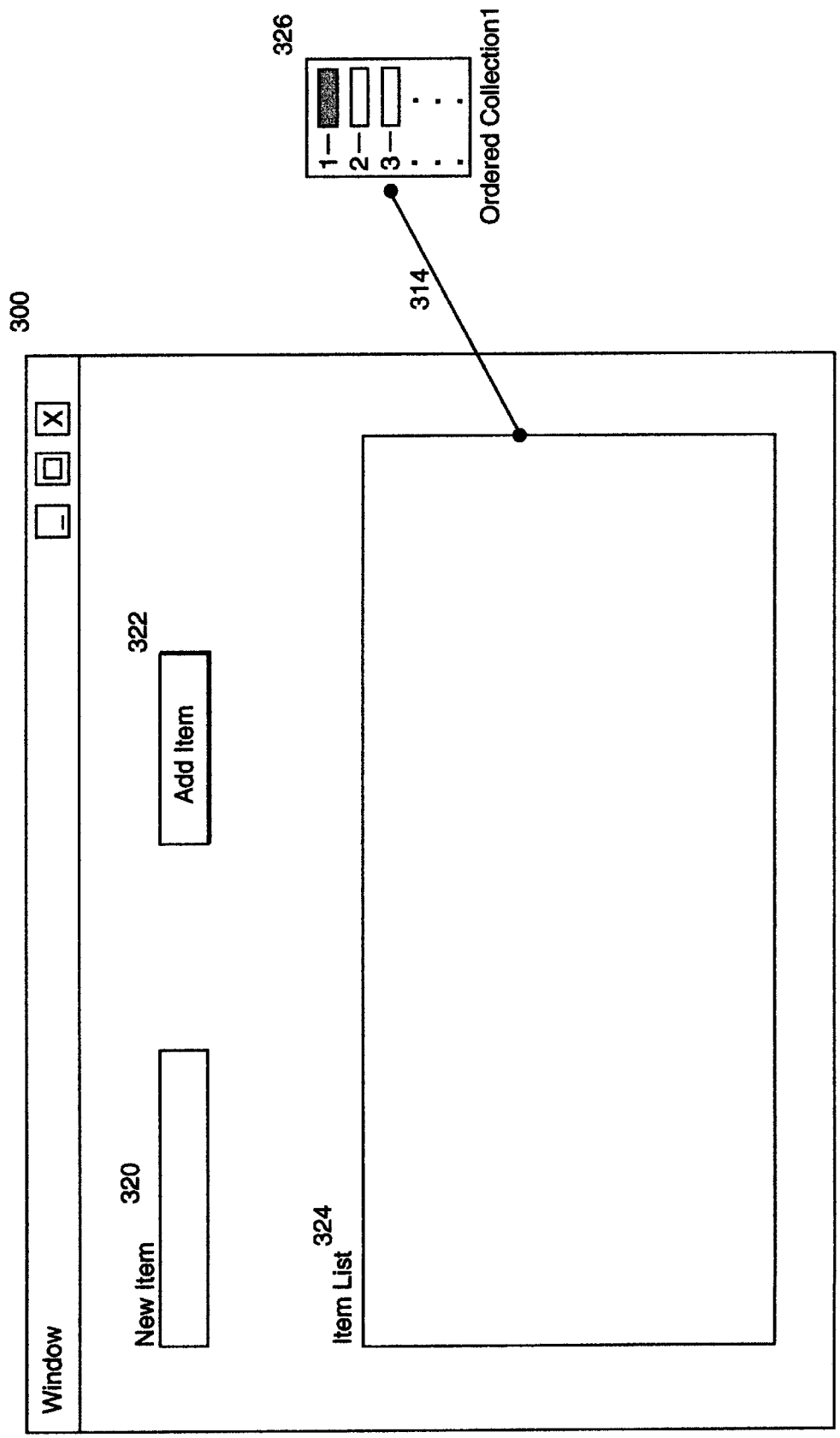
Figure 3G:
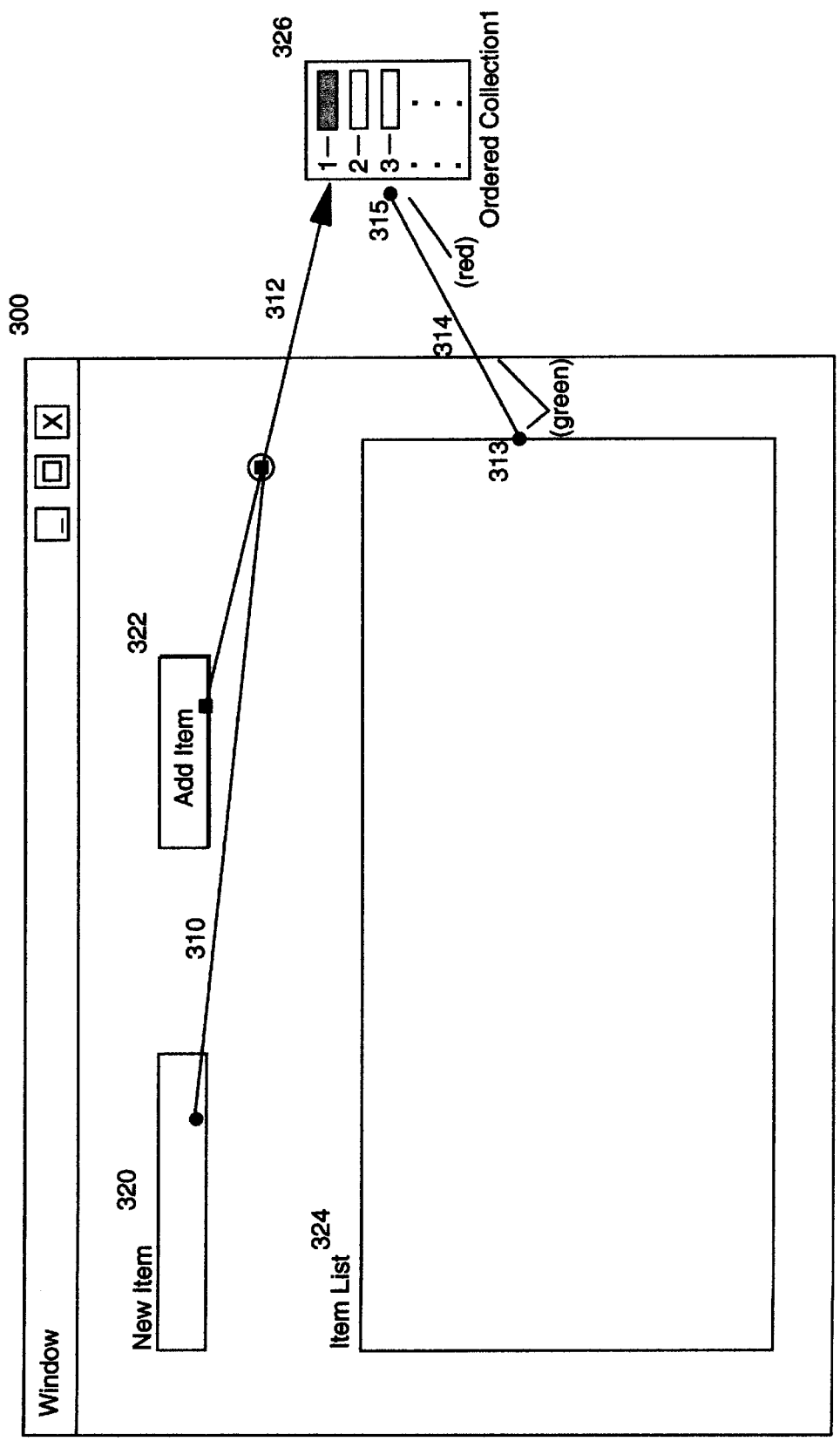
Figure 3H:
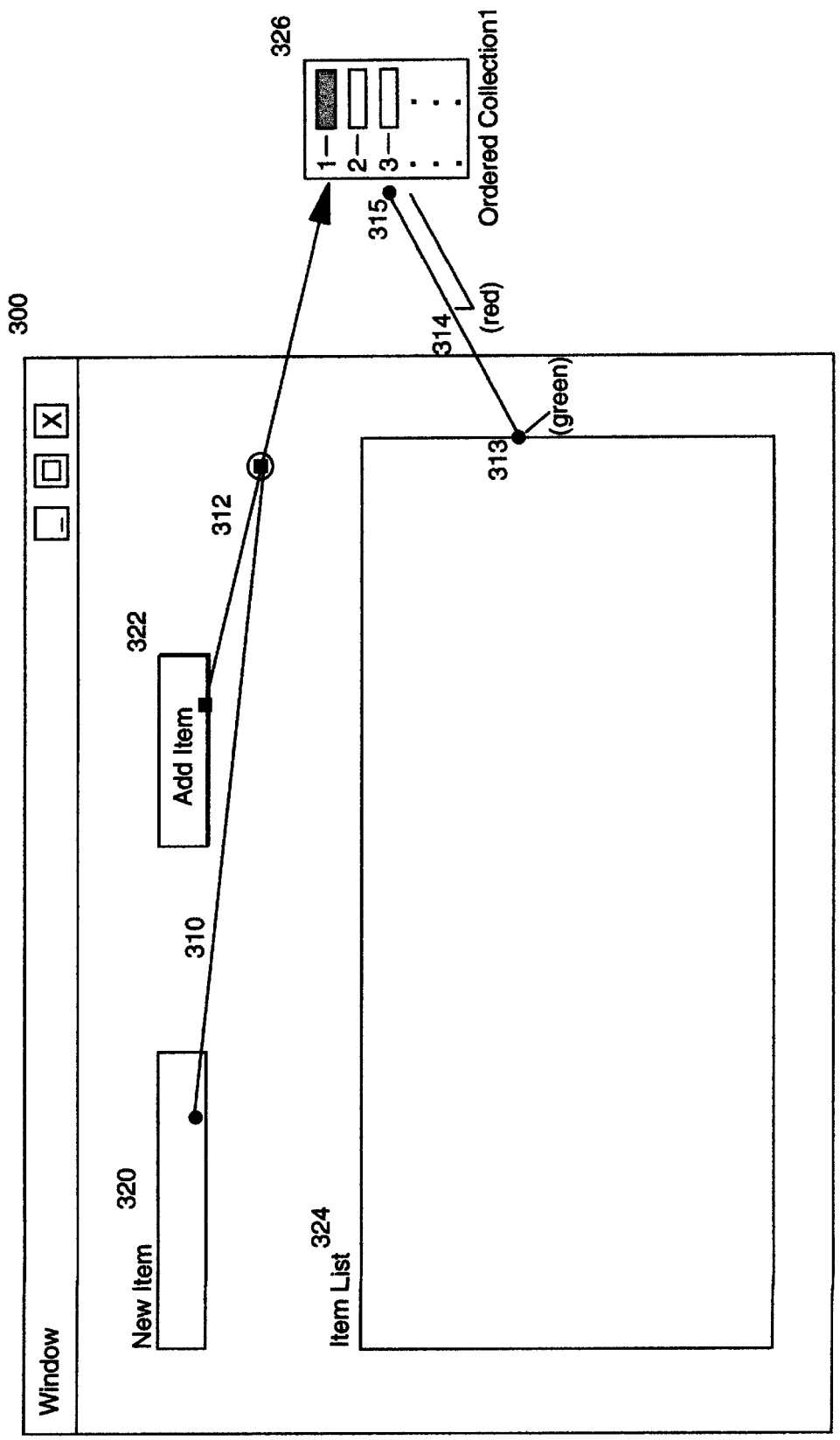
Figure 4:
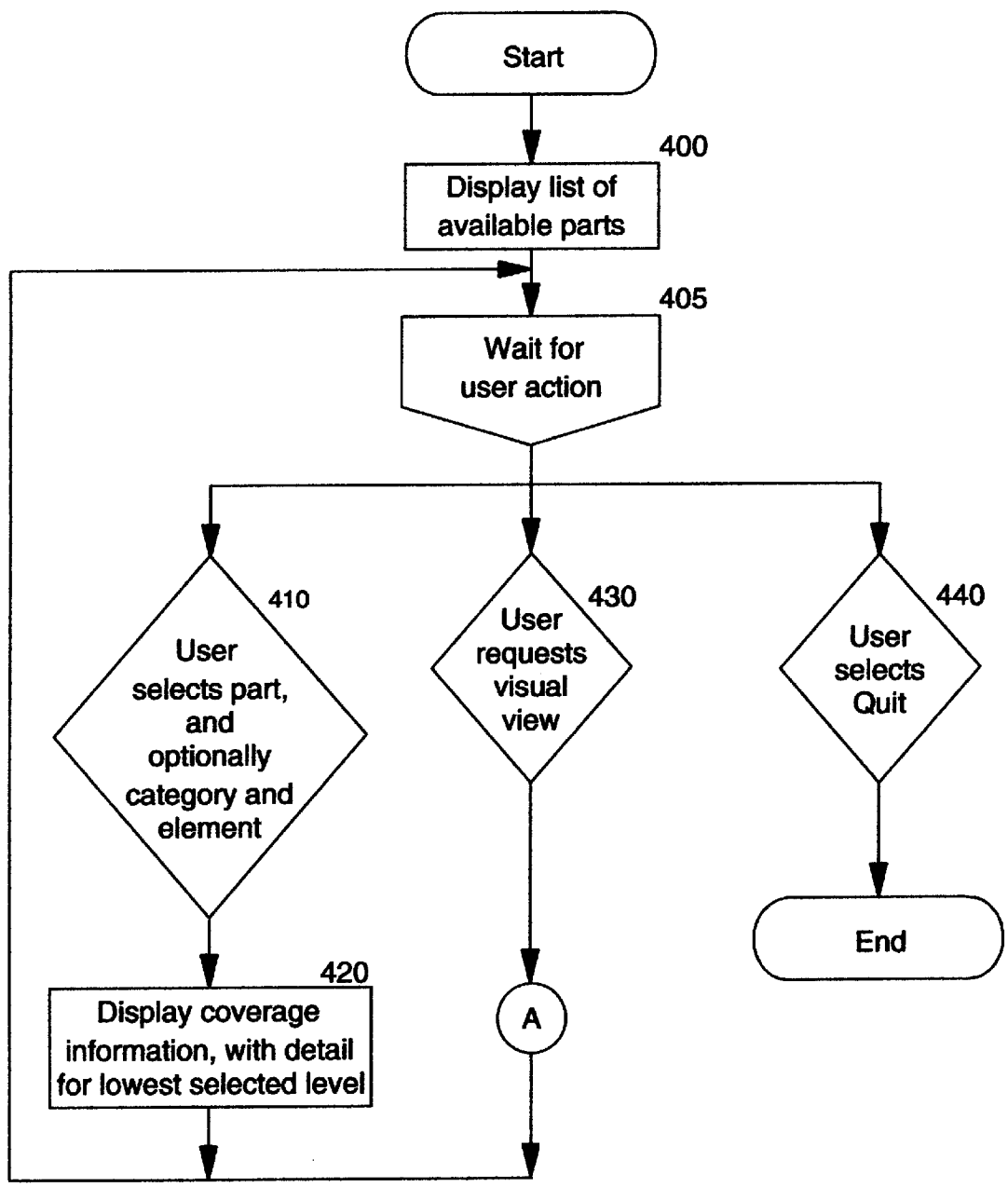
FIG. 4 illustrates a flowchart depicting a high-level flow of using the present invention to examine test coverage results.

The technique with which test coverage metrics are presented will now be discussed with reference to FIGS. 4 through 6, making reference to alternative presentation approaches illustrated in FIGS. 3B–3H and FIG. 7.

Figure 7:
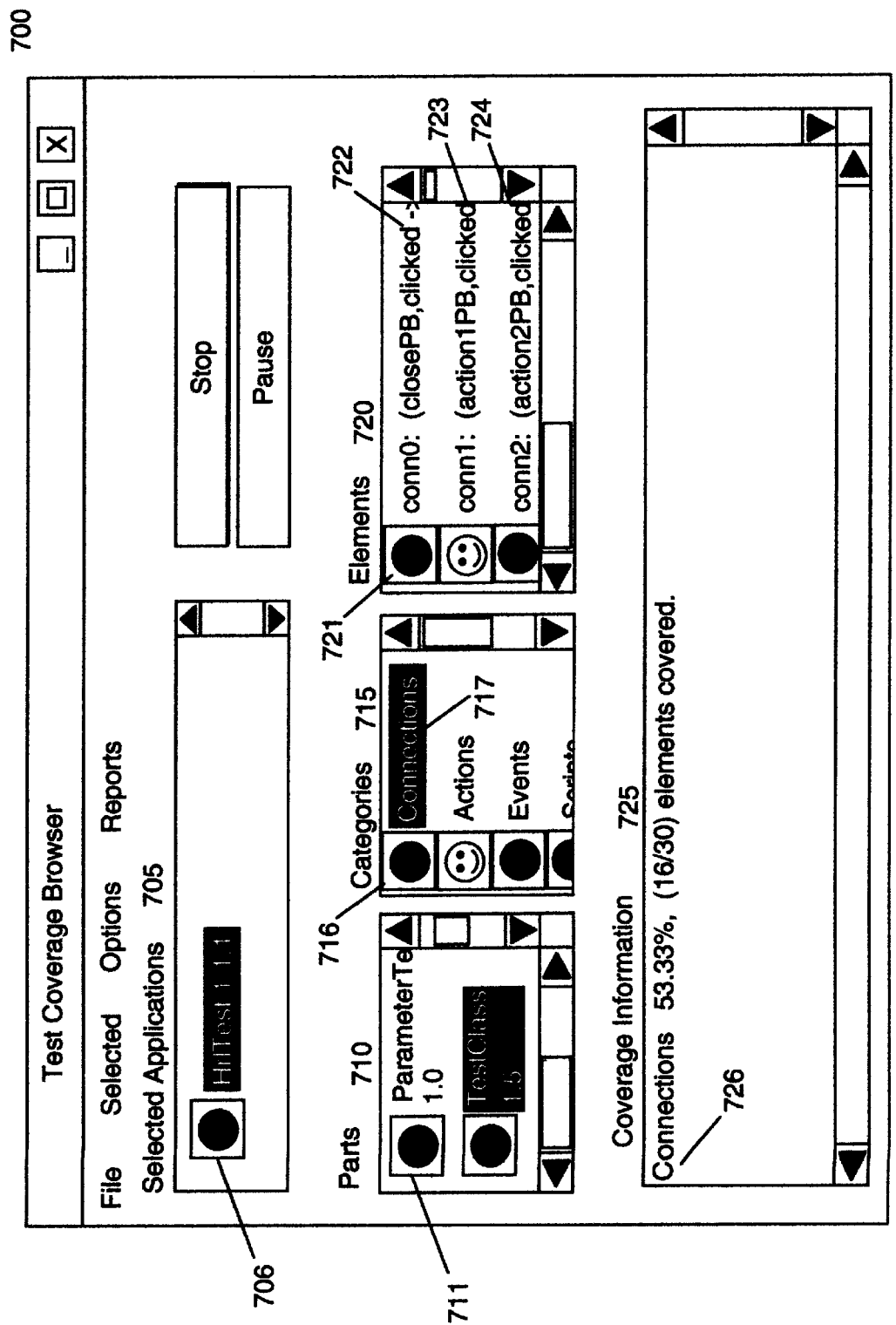
FIG. 7 illustrates an example of a hierarchical summary view that may be used to present test coverage information.

Visually-created programs may have both visual and non-visual aspects. The visual aspects are created using a visual editor, and include subparts and the connections between them. Non-visual aspects, on the other hand, are created with other types of editors (such as a code browser), and include the actions, events, and attributes which comprise a part's interface. According to the preferred embodiment of the present invention, test coverage information for the visual aspects is displayed in substantially the same view in which the programmer created the parts, while coverage for non-visual aspects is displayed using a hierarchical summary view that resembles a conventional code browser. FIGS. 3B through 3H illustrate examples of coverage information using a visual view, and FIG. 7 shows coverage information in the summary view. These figures will be discussed in more detail herein. These presentation styles are by way of example only, and are not meant to limit the present invention.

The presentation of test coverage information begins at Block 400, where a list is presented to the user. This list contains the programs, or parts, for which the user can request to see coverage information. The manner in which the list is presented does not form part of the present invention, and uses techniques which are known in the art. FIG. 7 shows one way in which this list may be presented, where a browser 700 has an "Applications" pane 705 where application names are displayed. Note that in this example, a hierarchical application structure is used where applications are comprised of parts, as shown in the "Parts" pane 710. This structure is not required, in which case the Applications pane 705 may be omitted.

Block 405 indicates that the implementation waits for user action. Blocks 410, 430, and 440 account for specific types of user input which are of significance to the present invention.

Block 410 indicates that the user selects the items for which he wishes to see coverage information. Using the hierarchical layout of browser 700, the selection may include an application, a part, a category (from the "Categories" pane 715), and an element (from the "Elements" pane 720). Or, he may select only an application, an application and one of its parts, or an application, one of its parts, and a category within that part.

Block 420 indicates that coverage information will be displayed for the user's selection, where detailed information is presented for the lowest level item selected. In the preferred embodiment, this coverage information comprises a summary visual indicator for each selected level such as the icons 706, 711, 716, and 721, as well as the detailed information 726 presented in "Coverage Information" pane 725. Each icon at the summary level indicates whether the corresponding item has been covered during the testing process. Icons of one color may be used for covered items, with icons of different colors used for items which have not been covered. Or, other indications of coverage (such as text) may be used. The detailed information displayed in pane 725 is preferably a line of text explaining the coverage status of the lowest-level item the user selected. In FIG. 7, the lowest level item selected was the "Connections" category 717 (where selection has been indicated by highlighting). Thus, the detailed information 726 explains that 16 out of 30 connections were covered, for a total of 53.33 percent. Similar information will be presented when the lowest-level selected item is one of the other categories, as well as when it is a part or an application. When is it an element (such as a specific connection 722), the detailed information may state simply whether the element was covered. However, for bi-directional attribute-to-attribute connections, the text may further indicate whether both directions were covered, and if not, which one was (or was not) covered.

When the items are displayed for analyzing their coverage status (using, for example, the list panes shown in FIG. 7), they may be displayed in alphabetical order by item name. Alternatively, they may be sorted before the display is created, with items that were not covered moved to the beginning of the display in order to highlight the areas needing further testing.

Block 430 is reached when the user has requested to open a visual view on a selected part, or on a part containing a selected connection. This request may be made using known techniques, such as double-clicking on a part or connection entry, popping up (or pulling down) a menu which has a selectable option for opening a visual view, pressing a function key corresponding to this function, etc. The process shown in FIG. 5 (and described in detail below) is preferably used to build and display the visual view.

Figure 5:
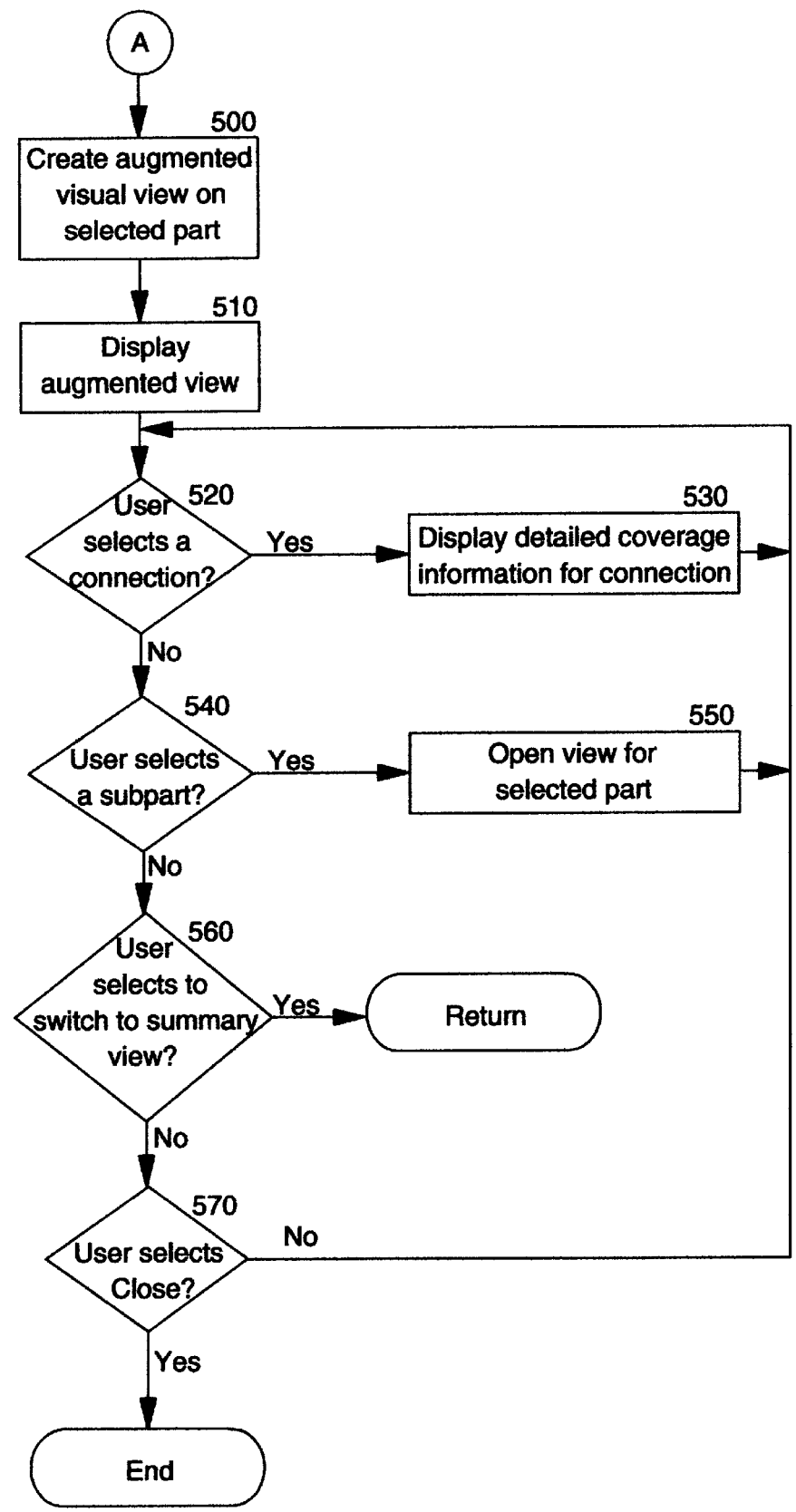
FIG. 5 illustrates a flowchart depicting logic that may be used in a preferred embodiment to create a visual view of test coverage.

Following the processing Block 420, or completion of the process of FIG. 5 which is invoked after Block 430, control returns to Block 405 to await the user's next selection.

Block 440 is reached when the user has requested to "Quit". The processing of FIG. 4 then ends.

FIG. 5 illustrates the process of creating a visual view for a selected part, according to the preferred embodiment. Block 500 creates the augmented visual view for the part selected by the user in Block 410 (or the part containing the selected connection, when applicable), using the same view the programmer used when the visual program was created. When the phrase "the same view" is used herein, it is meant that the layout of the visual elements is substantially the same. However, use of the present invention necessarily requires some visual changes to convey the augmented information. For example, different colors or additional text may be used to indicate coverage status for connections. These changes are discussed below with reference to the alternative aspects of the preferred embodiment. The manner in which the augmented view is created is described in more detail in FIG. 6.

At Block 510, the augmented visual view is displayed, showing the test coverage metrics which are applicable to this view. The user may then select elements from this augmented view, to request display of additional information. Blocks 520 and 540 represent this selection capability.

Block 520 asks whether the user has clicked on (or otherwise indicated selection of) a connection of the displayed visual view. If this test has a negative response, control transfers to Block 540. Otherwise, Block 530 displays more detailed information for this connection. In the preferred embodiment, this comprises displaying a line of text when the connection is bi-directional, indicating which direction was fired. The control flow of FIG. 5 then indicates returning to Block 520, to await the user's next selection.

Block 540 asks whether the user has selected a subpart of the displayed visual view. If this test has a negative response, control transfers to Block 560. Otherwise, Block 550 opens a view for this subpart. This view will differ depending on the type of subpart selected. Control then returns to Block 520. Alternatively, there may be no further information provided for subparts in the visual view. In that case, the processes of Blocks 540 and 550 may be omitted.

Block 560 asks whether the user has requested to return to the summary view. If not, processing continues to Block 570. Otherwise, control returns to the process of FIG. 4 (following Block 420).

At Block 570, a test is made to determine whether the user has selected to close this visual view. If this test has a positive response, the process of FIG. 5 ends. Otherwise, the user may have made a selection which is not pertinent to the present invention, and control returns to Block 520 to await the user's next selection.

Figure 6:
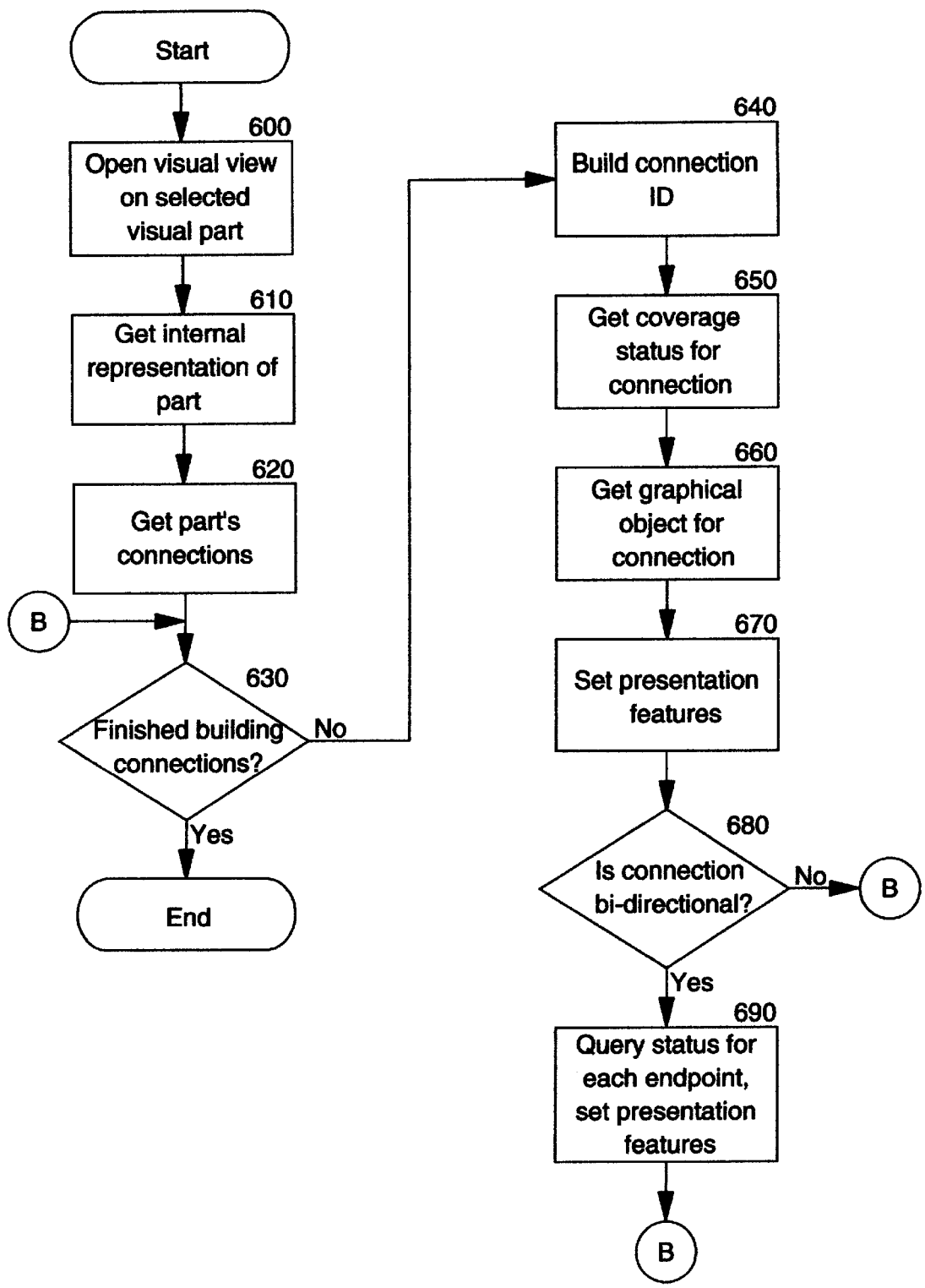
FIG. 6 illustrates a flowchart that expands on the level of detail in FIG. 5, describing the implementation of a preferred embodiment of creating an augmented visual view.

FIG. 6 expands on the level of detail shown for Block 500 of FIG. 5, and illustrates the process of creating a visual view of a part, where the part's connections are visually augmented with test coverage information.

At Block 600, the preferred embodiment opens a visual view on the selected visual part. Block 610 gets the internal representation of this part. This is done by sending a message such as "returnPart" or "getPart", using the specific message that has been provided by the visual programming environment in which the present invention is embodied.

Block 620 then gets this part's connections, again using a message such as "returnConnections" which is part of the visual programming environment. Each of these connections is then processed according to the logic of Blocks 640 through 690. Block 630 tests to see if processing all the part's connections is finished, and if so, the process of FIG. 6 ends.

Block 640 builds a connection identifier (referred to equivalently as a "connection ID") for this connection, which is preferably stored with the internal representation of the visual part. This may be done, for example, by sending a message such as "getID" to the connection object. The connection ID is then used in Block 650 to get the coverage status information for this connection. When the coverage status has been stored in a multi-dimensional array or Smalltalk dictionary, as discussed in the related invention titled "A Technique for Test Coverage of Visual Programs", the status can be retrieved using the connection ID as an index to the array or dictionary, and returning the Boolean coverage value of the corresponding entry.

Block 660 obtains the graphical object for this connection, which is stored with the internal representation of the visual part. Block 670 then augments this graphical object to visually convey coverage status by setting the appropriate presentation features of the object. The particular manner of conveying this status information may be predefined for an embodiment of the present invention, or a facility may be provided to enable a user to select the approach they prefer (e.g. by using a pull-down menu such as "Preferences", a pop-up menu, a configuration option, etc.).

If the retrieved status information indicates that the element has been covered, then the appropriate "covered" visual indicator is used when setting the presentation features of the object. Otherwise, the appropriate "not covered" visual indicator is used. Techniques for using the appropriate visual indicator are well known to one of ordinary skill in the art. For example, if green font is to be used for connections which have been covered, and red font is to be used for those which have not, the following pseudocode represents coding that might be used in an implementation of the present invention:

If element-was-covered
  Then connection-color:=green
Else
  connection-color:=red;

In an object-oriented environment, setting the connection's color may be achieved by sending a message to the object corresponding to the graphical representation of the connection, where the message may take a form such as "color: green".

In one aspect of the preferred embodiment, one color is used for connections that have been fired during testing, and a different color is used for those that have not fired. An example of this use of color is illustrated in FIG. 3B, where connections 310 and 312 are parenthetically marked to show that they would be displayed using green (indicating these connections were fired during testing), and connection 314 is parenthetically marked to show that it would be displayed using red (indicating that this connection did not fire).

In another aspect of the preferred embodiment, different line thicknesses may be used for connections, where a first line thickness indicates the connection fired, and a second line thickness indicates the connection did not fire. This is illustrated in FIG. 3C, showing that connections 310 and 312 fired, and that connection 314 did not. (Note that the user is expected to know which line thickness represents each case.)

In yet another aspect of the preferred embodiment, different line styles may be used for connections. A first line style, such as a solid line, can be used to indicate that a connection fired, while a second line style, such as a dashed or dotted line, can be used to indicate that the connection did not fire. This is illustrated in FIG. 3D.

In another aspect of the preferred embodiment, the visual program may use the same (or substantially the same) graphical representations of connections that were used when the programmer created the program, where the augmentation is provided by textual annotations. This is illustrated in FIG. 3E, where connections 310 and 312 each have text appearing nearby that says "covered", and connection 314 has text appearing nearby that says "not covered". In the preferred embodiment, the location for displaying the text is calculated as a small offset from the location of the corresponding connection (and this location may be obtained by sending a message to the connection, or otherwise querying stored location information).

In yet another aspect of the preferred embodiment, coverage status may be indicated by hiding connections from view which have a first coverage status, and displaying other connections which have the opposite coverage status. FIG. 3F illustrates this aspect, where connections 310 and 312 are no longer shown (indicating they were covered) while connection 314 is shown (indicating it was not covered). Whether to display those connections that were covered, or to hide them and display the ones not covered, depends on the user's preference. He may wish to see a visual indication of his progress (i.e. showing how many are already covered), or he may wish to see how much work remains in the testing process (i.e. showing those connections yet to be covered).

Block 680 asks whether this connection was bi-directional. If not, then control returns to Block 630 to process the next connection for this part. Otherwise, Block 690 queries the coverage status for each endpoint of the connection, to determine in which direction(s) the connection fired. The visual presentation features of the endpoints of the connection object are then set accordingly. FIG. 3G illustrates an example of this, where bi-directional connection 314 is shown as being green, endpoint 313 is also shown as being green, and endpoint 315 is shown as being red. This augmentation indicates that: (1) bi-directional connection 314 fired; (2) the direction of firing was with Item List part 324 as the target, and "Ordered Collection 1" part 326 as the source; and (3) the direction with part 324 as source and part 326 as target did not fire. Other techniques may be used for indicating coverage of endpoints, such as: solid arrowheads and arrowheads using a non-solid pattern; arrowheads accompanied by textual annotations; etc. Or, a separate arrow may be displayed for each direction, with an appropriate visual indicator for the coverage status of each arrow.

Alternatively, the user may prefer to see the coverage status of bi-directional connections set to "not covered" unless the connection fired in both directions. This is indicated in FIG. 3H, where the connection 314 is now shown as being red. The endpoint 313 is shown as being green, indicating that the connection did fire in this one direction (where part 324 is the target, as in FIG. 3G). Providing the user with the option of having a bi-directional connection shown as "covered" when at least one direction fired, or only when both directions fired, is an enhancement of the preferred embodiment.

When the bi-directional connection presentation features have been set, control returns to Block 630 to process the next connection for this part.

While the above visual characteristics provide several alternative ways of indicating coverage status, other techniques may be used without deviating from the inventive concepts of the present invention.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing system having a capability for component-based visual programming, computer readable code readable by said system for presenting test coverage metrics, comprising:

a subprocess for providing one or more component-based, visually-constructed programs, wherein each of said visually-constructed programs comprises a plurality of components, one or more connections between selected ones of said components, and zero or more of: (1) events to be signaled by components; (2) actions to be performed by components; and (3) attributes of components;

a subprocess for constructing a visual view of a selected one of said visually-constructed programs, wherein said visual view is substantially similar to a programming visual view used when constructing said selected visually-constructed program:

a subprocess for displaying graphical representations of said components and said connections on said visual view; and subprocess for augmenting said constructed visual view to visually indicate a test coverage status for selected ones of said connections.

2. Computer readable code for presenting test coverage metrics according to claim 1, wherein said visual indication further comprises using a first color for each of said selected connections having said test coverage status which indicates covered, and a second color for each of said selected connections having said test coverage status which indicates not covered.

3. Computer readable code for presenting test coverage metrics according to claim 1, wherein said visual indication further comprises using a first line style for each of said selected connections having said test coverage status which indicates covered, and a second line style for each of said selected connections having said test coverage status which indicates not covered.

4. Computer readable code for presenting test coverage metrics according to claim 1, wherein said visual indication further comprises using a first line thickness for each of said selected connections having said test coverage status which indicates covered, and a second line thickness for each of said selected connections having said test coverage status which indicates not covered.

5. Computer readable code for presenting test coverage metrics according to claim 1, wherein said visual indication further comprises using a first hidden status for each of said selected connections having said test coverage status which indicates covered, and a second hidden status for each of said selected connections having said test coverage status which indicates not covered.

6. Computer readable code for presenting test coverage metrics according to claim 1, wherein said visual indication further comprises annotating each of said selected connections with a textual indication of said test coverage status.

7. Computer readable code for presenting test coverage metrics according to claim 1, wherein said test coverage status is obtained from stored information containing a Boolean indicator for each of said selected connections, which indicates if said selected connection was covered.

8. Computer readable code for presenting test coverage metrics according to claim 1, further comprising a subprocess for displaying said test coverage status for said events, said actions, and said attributes in a hierarchical summary view.

9. A system for presenting test coverage metrics in a computing system having a capability for component-based visual programming, comprising:

one or more component-based, visually-constructed programs, wherein each of said visually-constructed programs comprises a plurality of components, one or more connections between selected ones of said components, and zero or more of: (1) events to be signaled by components; (2) actions to be performed by components; and (3) attributes of components;

means for constructing a visual view of a selected one of said visually-constructed programs, wherein said visual view is substantially similar to a programming visual view used when constructing said selected visually-constructed program;

means for displaying graphical representations of said components and said connections on said visual view; and means for augmenting said constructed visual view to visually indicate a test coverage status for selected ones of said connections.

10. The system for presenting test coverage metrics according to claim 9, wherein said visual indication further comprises using a first color for each of said selected connections having said test coverage status which indicates covered, and a second color for each of said selected connections having said test coverage status which indicates not covered.

11. The system for presenting test coverage metrics according to claim 9, wherein said visual indication further comprises using a first line style for each of said selected connections having said test coverage status which indicates covered, and a second line style for each of said selected connections having said test coverage status which indicates not covered.

12. The system for presenting test coverage metrics according to claim 9, wherein said visual indication further comprises using a first line thickness for each of said selected connections having said test coverage status which indicates covered, and a second fine thickness for each of said selected connections having said test coverage status which indicates not covered.

13. The system for presenting test coverage metrics according to claim 9, wherein said visual indication further comprises using a first hidden status for each of said selected connections having said test coverage status which indicates covered, and a second hidden status for each of said selected connections having said test coverage status which indicates not covered.

14. The system for presenting test coverage metrics according to claim 9, wherein said visual indication further comprises annotating each of said selected connections with a textual indication of said test coverage status.

15. The system for presenting test coverage metrics according to claim 9, wherein said test coverage status is obtained from stored information containing a Boolean indicator for each of said selected connections, which indicates if said selected connection was covered.

16. The system for presenting test coverage metrics according to claim 9, further comprising means for displaying said test coverage status for said events, said actions, and said attributes in a hierarchical summary view.

17. A method for presenting test coverage metrics in a computing system having a capability for component-based visual programming, comprising the steps of:

constructing a visual view of a selected one of one or more component-based, visually-constructed programs, wherein each of said visually-constructed programs comprises a plurality of components, one or more connections between selected ones of said components, and zero or more of: (1) events to be signaled by components; (2) actions to be performed by components; and (3) attributes of components and wherein said visual view is substantially similar to a programming visual view used when constructing said selected visually-constructed program;

displaying graphical representations of said components and said connections on said visual view; and augmenting said constructed visual view to visually indicate a test coverage status for selected ones of said connections.

18. The method for presenting test coverage metrics according to claim 17, wherein said visual indication further comprises using a first color for each of said selected connections having said test coverage status which indicates covered, and a second color for each of said selected connections having said test coverage status which indicates not covered.

19. The method for presenting test coverage metrics according to claim 17, wherein said visual indication further comprises using a first line style for each of said selected connections having said test coverage status which indicates covered, and a second line style for each of said selected connections having said test coverage status which indicates not covered.

20. The method for presenting test coverage metrics according to claim 17, wherein said visual indication further comprises using a first line thickness for each of said selected connections having said test coverage status which indicates covered, and a second line thickness for each of said selected connections having said test coverage status which indicates not covered.

21. The method for presenting test coverage metrics according to claim 17, wherein said visual indication further comprises using a first hidden status for each of said selected connections having said test coverage status which indicates covered, and a second hidden status for each of said selected connections having said test coverage status which indicates not covered.

22. The method for presenting test coverage metrics according to claim 17, wherein said visual indication further comprises annotating each of said selected connections with a textual indication of said test coverage status.

23. The method for presenting test coverage metrics according to claim 17, wherein said test coverage status is obtained from stored information containing a Boolean indicator for each of said selected connections, which indicates if said selected connection was covered.

24. The method for presenting test coverage metrics according to claim 17, further comprising the step of displaying said test coverage status for said events, said actions, and said attributes in a hierarchical summary view.

* * * * *